United States Patent
Carrera et al.

(10) Patent No.: US 8,498,221 B2
(45) Date of Patent: Jul. 30, 2013

(54) METHOD AND APPARATUS FOR PROTECTING WIRELESS MEDIA STREAMS

(75) Inventors: Marianna Carrera, Vanves (FR); Nidhi Hegde, Paris (FR); Martin May, Paris (FR)

(73) Assignee: Thomson Licensing, Issy-les_Moulineaux (FR)

( * ) Notice: Subject to any disclaimer, the term of this patent is extended or adjusted under 35 U.S.C. 154(b) by 0 days.

(21) Appl. No.: 13/212,515

(22) Filed: Aug. 18, 2011

(65) Prior Publication Data

US 2013/0044615 A1 Feb. 21, 2013

(51) Int. Cl.
*H04L 12/26* (2006.01)
*H04J 3/00* (2006.01)

(52) U.S. Cl.
USPC .......................................... 370/252; 370/336

(58) Field of Classification Search
USPC .................................................. 370/252, 336
See application file for complete search history.

(56) References Cited

PUBLICATIONS

Marianna Carrera, SHAPE the Wireless Trafic in the Home Network, Jul. 11, 2011, 1-135.*
Paris-Networking, Upcoming events, Jun. 28, 2011, 1-3.*
PhD Thesis Defense, Jul. 11, 2011, 1-3.*
UPMC, UPMC Doctoral Candid Guide 2011-2012, 2011, 44-48.*
Carrera, SHAPE the Wireless Traffic in the Home Network, Jul. 11, 2011, UPMC Paris University, pp. 1-135.*
Carrera et al., SHAPE: Scheduling in Wireless Home Networks, Jan. 10, 2011, Technicolor Technical Report, pp. 1-9.*

* cited by examiner

*Primary Examiner* — Andrew Lai
*Assistant Examiner* — Albert Shih
(74) *Attorney, Agent, or Firm* — Myers Wolin, LLC

(57) ABSTRACT

A method is described including determining if a downlink data packet needs to be transmitted, transmitting the downlink data packet, determining if an uplink data packet has been received, determining if the received uplink data packet was transmitted by a protected station and performing scheduling. An apparatus is described including a scheduling module which controls access opportunities of protected uplinks and protected downlinks, the scheduling module is in communication with an uplink profiler and a medium access module, the uplink profiler module maintains statistics regarding the protected uplinks and the uplink profiler is in communication with the scheduling module and the medium access module performs actual transmission of data and the medium access module is in communication with the scheduling module.

4 Claims, 19 Drawing Sheets

METHOD AND APPARATUS FOR PROTECTING WIRELESS MEDIA STREAMS

FIELD OF THE INVENTION

The present invention relates to the delivery of multimedia content streams over a wireless home network.

BACKGROUND OF THE INVENTION

The burgeoning field of wireless multimedia devices and the appetite for high-bandwidth multimedia content have led to a challenging home networking environment. In a marked move away from analog TV and DVDs, multimedia is increasingly being consumed through the network portal, and produced or hosted inside the home, bringing higher loads of performance-sensitive traffic to the home network. Further, by design and use, home media servers, set-top boxes and personal devices such as phones and tablets send and receive traffic mostly on wireless links. Amplifying the scarcity of capacity on the wireless medium, there is increased volume and diversity of traffic (multimedia, data, home monitoring and automation traffic, etc.) transmitted via the access point (AP). Thus, the AP, being the relay for all wireless traffic, must assume the role of ensuring throughput assurances for traffic identified as being important. Moreover, home networks are often unmanaged and host a variety of different devices from different vendors. Therefore, a viable solution must be automated, widely compatible and have a simple end-user interface.

There has been an effort by the IEEE 802.11 standards and the Wi-Fi Alliance to address the issue of multimedia traffic in Wi-Fi networks. The prioritized-QoS defined by IEEE 802.11e HCF-EDCA does not provide throughput guarantees, but only provides classes of traffic differentiation, where traffic of higher priority have a statistical advantage in the competition for medium access. With this approach, based on random access, each station decides which traffic to prioritize and thus the number of transmitters competing in the same traffic class is neither predictable nor controllable. The IEEE 802.11e standard has also defined a centralized approach, HCF-HCCA, to provide parameterized-QoS, which has never been adopted by Wi-Fi card vendors. Two main areas of work related to SHAPE have been studied: the medium access mechanisms of Wi-Fi networks and centralized traffic management.

In medium access the IEEE 802.11 standard defines a distributed random medium access mechanism (DCF), a polling-based medium access mechanism (PCF) and a hybrid solution (HCF) including a prioritized distributed random medium access (HCF-EDCA) and a polling-based medium access mechanism (HCF-HCCA). DCF, implemented in every Wi-Fi-certified device, aims for per-transmitter fairness and does not provide any traffic differentiation or prioritization. As the Wi-Fi Alliance does not provide a certification process for PCF and HCF-HCCA, these are rarely implemented in off-the-shelf products. HCF-EDCA, part of the IEEE 802.11e standard, is fairly widely accepted and aims at providing prioritized QoS. Some flavors of HCF-EDCA are certified by Wi-Fi Alliance as Wi-Fi Multimedia (WMM) capabilities, or Wireless Media Extension (WME) and devices with such implementations are generally referred to as QoS-enabled. The scheduled medium access (HCF-HCCA) defined by IEEE TGe was never certified and it is not commonly available. Other extensions such as direct link setup (DLS) have not been certified either.

In a non-QoS WLAN, IEEE 802.11 DCF provides statistically equal transmission opportunities to each transmitter. This per-transmitter fairness is known to produce unexpected results in the presence of heterogeneous stations such as transmitters using different raw bit rates. This is known in the art as the rate anomaly problem.

The prioritized-QoS defined by HCF-EDCA does not provide throughput guarantees, but only differentiates classes of traffic, where traffic of higher priority has a statistical advantage in the competition for medium access. Moreover, the effectiveness of the prioritization provided by HCF-EDCA depends on the medium access parameters (primarily the AIFS) adopted by each station for each class of traffic. In particular, it has been experimentally shown that in the case where a single station receives traffic tagged as background, while several stations transmit and receive traffic tagged as voice, the quality of the VoIP calls is acceptable only when the prioritized traffic accesses the medium with an AIFS parameter at least 6 slots shorter than that of the single background traffic flow. However, FIG. 1 shows, the default AIFS values used by non-QoS IEEE 802.11 devices is a SIFS plus 2 slots and that of best effort QoS traffic is a SIFS plus 3, and thus, higher priority traffic cannot use an AIFS that is 6 slots shorter. As a consequence, high priority traffic will only be able to obtain some share of the bandwidth available in the WLAN, and this will be further shared among all the high priority transmitters. Therefore, despite the statistical advantage, WMM WLANs cannot provide throughput guarantees to multimedia flows.

IEEE HCF-HCCA provides parameterized-QoS by having stations perform scheduled medium access with access control. Although some research has been devoted to solve the related scheduling problem, it is believed that this technology has never been deployed in off-the-shelf devices for the wireless home network. Further, the lack of a certification process suggests that a deployment of such technology is not imminent. TDMA medium access mechanisms are also able to enforce a centrally determined schedule. One prior art scheme designed a TDMA MAC for wireless mesh networks, using IEEE 802.11 hardware. All of these QoS enabling solutions assume station compliance. In contrast, SHAPE provides per-link bandwidth reservation, requiring no modification, nor compliance, of unaware legacy stations.

The recently standardized IEEE 802.11n has also attempted to address the issue of allocation of resources (transmission opportunities). For instance, the reverse direction grant (RDG) allows the AP, at the end of its transmission, to hand over transmission time to a station. This is, however, best-suited to bi-directional traffic and further requires the station to be compliant with the newer versions of the standard. It is, thus, not suitable for unidirectional multimedia traffic and for legacy devices.

The use of CTS frames as a silencing technique, outside the legacy RTS-CTS exchange, has recently gained increasing interest. Another prior art scheme proposed a micro-probing technique, where several APs in an enterprise WLAN synchronously transmit CTS-to-self frames to silence all the stations in a wide area and then perform quick link probing experiments in order to speed up the computation of interference graphs, while avoiding network downtimes. Yet another prior art scheme proposes Virtual PCF, in which unsolicited CTS are transmitted from an AP to a VoIP station, in order to silence the other stations and reduce the jitter experienced by VoIP packets.

Centralized traffic management in wireless enterprise networks is an active research area. Initially work focused on simplifying management and avoiding configuration errors.

Lately, the interest has shifted towards solving performance problems particular to wireless networks, such as scheduling of conflicting links. Little attention has been paid to small unmanaged home networks, which today host a number of bandwidth-demanding devices. One prior art scheme studied the problem of traffic management in home networks, from an end-host perspective and not limited to the wireless network.

SUMMARY OF THE INVENTION

The terms traffic, data and content are used interchangeably herein and include (but are not limited to) multimedia content, audio data, voice data, voice traffic and the like. That is, all forms of data are possible. Data is transmitted either as frames or packets which are ways in which the data (content) may be formatted.

Today's home hosts an increasing number of multimedia devices, such as media servers, set-top boxes and IP-TVs. As users favor wireless devices, home Wi-Fi networks are facing the challenge of providing throughput assurances for multimedia traffic. The present invention is directed to a Smart Home Access Point Environment (SHAPE), which enforces random access medium sharing in order to satisfy performance requirements of prioritized wireless links, while requiring no modification to legacy IEEE 802.11 stations. SHAPE is implemented and it is shown through experiments that SHAPE effectively provides the required throughput to wireless links with heterogeneous target throughputs, even when co-located with a non-SHAPE WLAN. Further, it significantly reduces delay jitter, a critical metric for multimedia traffic.

SHAPE is an implicit control mechanism at the AP for throughput guarantees over wireless in the home networking. Key features of SHAPE are simplicity of configuration and transparency with respect to legacy IEEE 802.11 devices. Simplicity as used herein is in contrast with the approaches based on traffic tagging. That is, SHAPE requires neither cross-layer nor end-to-end agreements and little or no user interaction. Transparency as used herein means that the present invention provides throughput guarantees to unmodified IEEE 802.11 devices and in the presence of similar legacy devices in the neighborhood, i.e., inside or outside the logical scope of the wireless home network. SHAPE achieves throughput guarantees through a modified medium access mechanism retaining simplicity and transparency.

SHAPE's effectiveness has been validated on a test bed including a prototype implementation of a SHAPE AP on off-the-shelf hardware. The evaluation focuses on providing throughput guarantees to traffic flowing from unmodified IEEE 802.11 stations associated with the SHAPE AP, as it is believed that this scenario represents the main challenge for such a transparent system. SHAPE can effectively provide throughput guarantees and considerably smaller jitter delay, whenever the required aggregate throughput is within the bandwidth available in the WLAN. Moreover, while SHAPE guarantees accesses to the medium to those stations requiring throughput guarantees, it does not starve competing traffic more than what is strictly needed, since SHAPE achieves network utilization comparable to a normal IEEE 802.11 WLAN.

SHAPE provides throughput guarantees to Wi-Fi links while requiring no modification to legacy Wi-Fi devices. SHAPE satisfies the above requirements by enforcing medium sharing within the same framework of random access defined in IEEE 802.11 DCF. Key features of SHAPE are a modified aggressive medium access and an implicit polling mechanism based on unsolicited CTS frames.

SHAPE was prototyped and tested on off-the-shelf hardware and deployed it on an indoor test bed. Experiments were conducted that showed that SHAPE effectively provides the required throughput to wireless links with heterogeneous target throughputs in the presence of other Wi-Fi traffic, even when co-located with a non-SHAPE WLAN.

SHAPE adopts a modified medium access protocol, based on the transmission of unsolicited CTS frames, where the AP controls how stations access the medium, similar to polling medium access without, however, requiring stations in range to understand a polling based mechanism. That is, SHAPE takes an AP-centric approach, believing that unmanaged home networks are unlikely to deploy a traffic management system on every device of the network. SHAPE, therefore, proposes a solution where an intelligent AP can control the wireless medium sharing in presence of unmodified IEEE 802.11 devices.

A method is described including determining if a downlink data packet needs to be transmitted, transmitting the downlink data packet, determining if an uplink data packet has been received, determining if the received uplink data packet was transmitted by a protected station and performing scheduling. An apparatus is described including a scheduling module which controls access opportunities of protected uplinks and protected downlinks, the scheduling module is in communication with an uplink profiler and a medium access module, the uplink profiler module maintains statistics regarding the protected uplinks and the uplink profiler is in communication with the scheduling module and the medium access module performs actual transmission of data and the medium access module is in communication with the scheduling module.

BRIEF DESCRIPTION OF THE DRAWINGS

The present invention is best understood from the following detailed description when read in conjunction with the accompanying drawings. The drawings include the following figures briefly described below:

FIG. 8A shows the instance where LD-5 starts transmitting first and FIG. 8B shows the instance where LD-5 starts transmitting when another link (B-D) is active.

DETAILED DESCRIPTION OF THE PREFERRED EMBODIMENTS

Figure 1:
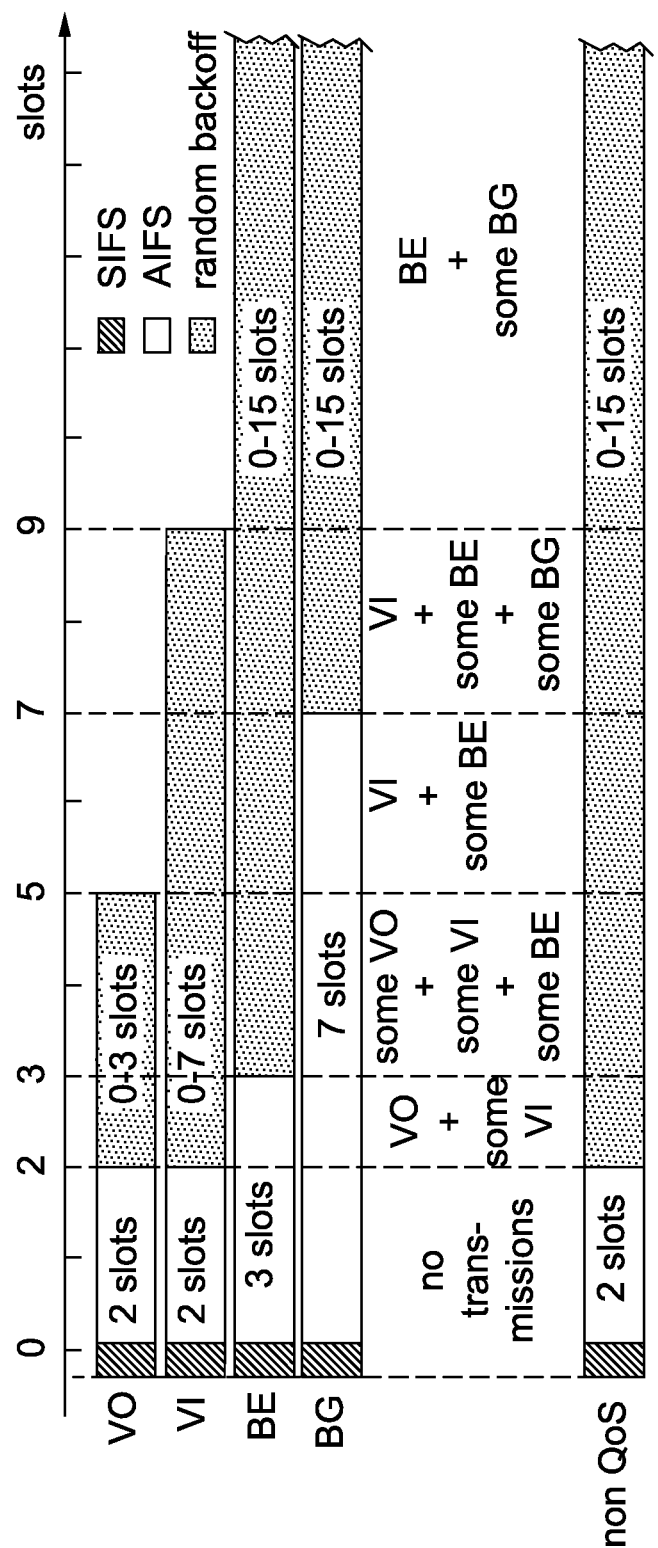
FIG. 1 shows the repartitioning of WMM stations competing for the medium, assuming default WMM parameters.

It is believed that there is a need for a system able to provide throughput guarantees over wireless in the home network. Particular emphasis is placed on protecting multimedia streams, as they are fairly intolerant to bandwidth allocation below target levels and the situation where bandwidth requirement is not fulfilled is visibly obvious and annoying to and for the end user. The multimedia traffic to be protected may be to or from a subset of home network devices, and may have strict and heterogeneous bandwidth requirements.

The design of such a system (SHAPE) is described giving consideration to transparency and simplicity. Regarding transparency, no modification nor awareness of the present invention (SHAPE) is required of legacy IEEE 802.11 devices, i.e., the system functions seamlessly. Regarding simplicity, the present invention (SHAPE) has minimal user interaction and configuration overhead. The rationale behind such considerations and constraints is deployability on unmanaged Wi-Fi home networks.

The first choice in the design of such a system is the granularity of traffic differentiation: e.g., shall it allocate bandwidth to MAC layer links, transport layer flows or classes of traffics? In the case of HCF-EDCA, classes of traffic are prioritized; however, this capability is ineffective if the sender application or operating system does not set the IP TOS field appropriately.

For targeted traffic, such as live multimedia, providing guarantees at flow-level would be a primary objective. However, any assurance at flow-level requires end-to-end coordination and interaction of cross-layer protocols. Such compliance and configuration overhead is in conflict with our requirements of simplicity and transparency. Recall that the present invention focuses on the home network. The ideal point of control for the present invention is, thus, the AP residing in the home gateway. The AP is primarily a MAC layer device acting on all wireless flows traversing it. Therefore, the present invention preserves throughput assurances at the MAC-layer of links, focusing on mechanism design at the AP.

As a consequence, the following definition of "link" is adopted. A "link" is a wireless communication between a station and either the AP itself or another associated station. In particular, the following terminology is used herein: an uplink is a link from an IEEE 802.11 station to the AP; a downlink is a link from the AP to an IEEE 802.11 station; a 2-hop link is a wireless communication from a station to another station, which in the IEEE 802.11 star-topology is achieved by relaying at the AP (unless both stations and the AP are QoS enabled, willing to set up a direct link and are in range of each other, or in case they both implement the Wi-Fi Direct technology). "Protected link" is defined herein as any of the above links for which the system provides throughput guarantees.

A common scenario, where an uplink will be configured as protected, is a media server streaming videos wirelessly towards a set-top box on the wired home LAN, or towards the Internet. A scenario that requires the protection of a downlink is a wireless set-top box receiving a video stream from either a home media server in the Ethernet LAN, or from the Internet. A 2-hop link will be protected when the streamer (e.g., a media server) and the receiver (e.g., a set-top box) are both wirelessly connected to the home network, thus resulting in an uplink to the AP and downlink from the AP to the receiver.

The second challenge in the design of such a system is the choice of the medium access mechanism that allows not merely differentiation, but outright protection of multimedia streams. Several mechanisms defined by the IEEE 802.11 standard, as well as some less orthodox variations, are considered. The necessity to achieve wireless bandwidth reservation in a manner that is transparent to legacy IEEE 802.11 devices restricts the solution space for the medium access mechanism.

As already mentioned, the IEEE 802.11 standard defines a scheduled medium access (HCF-HCCA) which allows for parameterized QoS. An important drawback of HCF-HCCA, beyond its complexity, is the need for station compliance, i.e., in order for a link to be allocated a target bandwidth, both the AP and the station must be HCF-HCCA compliant. However, home network devices that are fully HCF-HCCA capable are not known at this time. HCF-HCCA is, thus, not a viable solution. As well, HCF-EDCA is not alluring, as it provides only a statistical advantage to prioritized traffic, not throughput guarantees. TDMA medium access mechanisms are also able to enforce differential bandwidth allocation, however, just as HCF-HCCA, TDMA MAC assumes station compliance and a significant modification to their medium access.

It is, therefore, desirable to operate within the limits of the IEEE 802.11 DCF mechanism, this being the most widely adopted Wi-Fi access mechanism. The present invention is, therefore directed to a design, only at the AP, a medium access mechanism different from the IEEE 802.11 DCF only that it is able to control how neighboring stations access the medium, while requiring no modification on such stations. Such a benign modification is ideal, since unmanaged home networks are unlikely to deploy a mechanism requiring a set of new devices compliant with a new traffic management system. Advantage is taken of an implicit reservation method readily available, the virtual carrier sensing mechanism, through the use of unsolicited-CTS. One prior art work proposed an uncommon use of Clear-To-Send (CTS) frames, transmitted by the AP with shorter deferring time than that of the stations, in order to silence all devices in the range of the AP, except one device, which is thus implicitly polled. While this mechanism has been proposed to protect periodic VoIP frames transmissions, the present invention adopts the idea of unsolicited CTS frames as a way to control the medium sharing of an entire WLAN, while being transparent to legacy IEEE 802.11 stations.

Admission control is key to any mechanism with throughput guarantees, in order to ensure that the required bandwidth is available. In the wireless environment where variations in physical rate of stations impact the available bandwidth directly, this type of resource control is important even during flow duration. Estimating available bandwidth in a WLAN environment is indeed non-trivial. However, assuming that the present invention can detect situations where the available bandwidth is insufficient to guarantee protected throughput, how should it react?

In such a period of congestion, the control mechanism may simply fall back to satisfy some fairness measure, e.g., proportional fairness, max-min, max-throughput. However, the goal of such a system being to guarantee bandwidth requirements, not just provide differentiation, such fairness criteria are not satisfactory. Therefore, whenever it is impossible to fit all the protected traffic in the available bandwidth, the system must decide to stop protecting one link. The criteria for choosing the link is varied: e.g., high target throughput, in an attempt to quickly free up resources, or some other manner of flow identification. However, taking into account the link's behavior at the MAC layer (e.g., modulation and retransmissions) may be more effective.

In light of the above discussion on the crucial elements of the design space, the design of the present invention (SHAPE) is now described.

Figure 2:
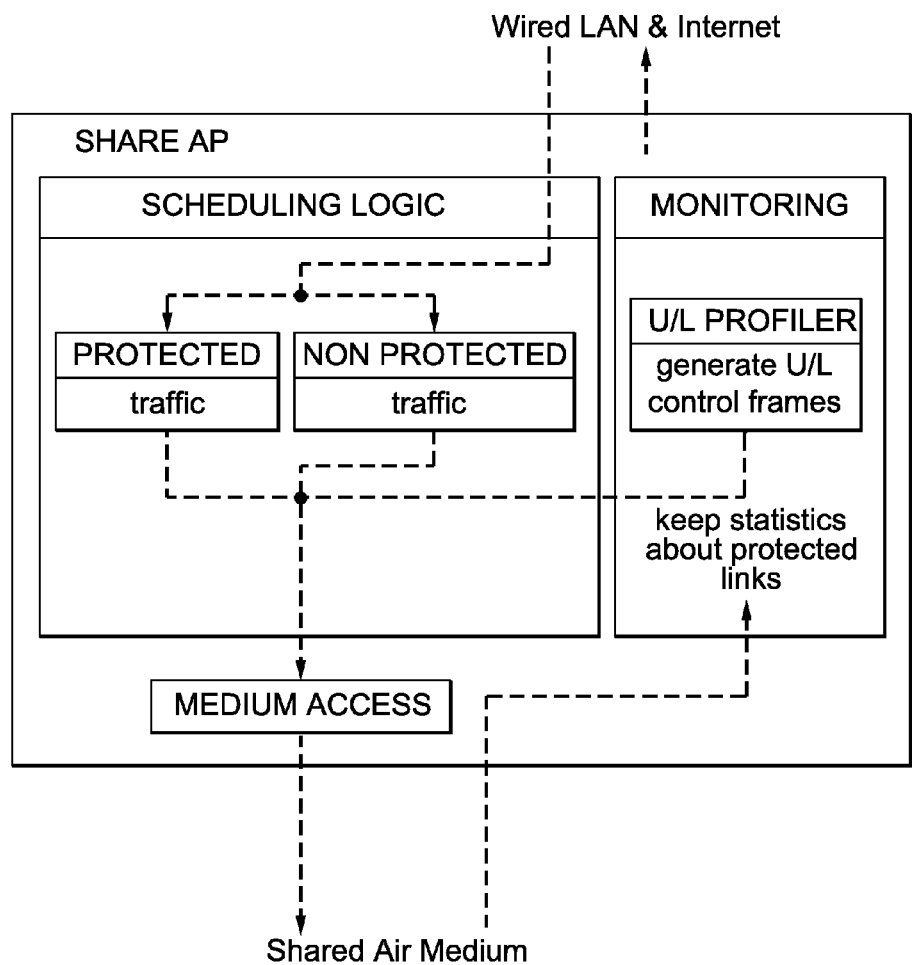
FIG. 2 is an exemplary functional block diagram of the present invention (SHAPE).

Aiming for a system that is oblivious to users, SHAPE is completely automated with the only possible user feedback being for the construction of the table of protected links and their target throughputs. Even this interaction can be minimized with a protocol such as DLNA that can identify multimedia devices in the home network and automatically add the identified devices to the list of protected links. Further, the system is dynamic, in that it accepts on-line changes to both the list of protected links and their target throughputs. The design of SHAPE indeed allows for allocation of the available bandwidth to protected links, according to their target throughput, dynamically adjusting to varying network conditions. As illustrated in FIG. 2, SHAPE is centered on three main functionalities: the uplink profiler module, that keeps statistics about protected uplinks and generates the necessary control frames; the scheduling logic, that stores all the frames to be transmitted (downlink data and management frames as well as CTS frames addressed to protected uplinks) and schedules frames for transmission; and the medium access, that takes care of the actual transmission. In order for the uplink profiler to gather and maintain statistics on the various protected uplinks it must receive information from the medium access control module either directly or via memory (buffer). In order to transmit the control frames generated by the uplink profiler, the control frames are forwarded to the scheduling module by the uplink profiler for transmission via the medium access module.

FIG. 2 illustrates the interaction of these functional blocks. To greatly simplify the diagram, those functionalities common to any IEEE 802.11 AP (e.g., beaconing and association management) are omitted.

The medium access of a SHAPE AP has two main characteristics: first, the medium access preempts channel access by using short deferral time intervals; second, the medium access reserves time for uplink transmissions by the means of an unsolicited CTS. Such a modified medium access satisfies the requirements of transparency, as it is effective in the presence of unmodified IEEE 802.11 devices (QoS enabled or not), and allows SHAPE to be deployed by upgrading only the AP.

Figure 3:
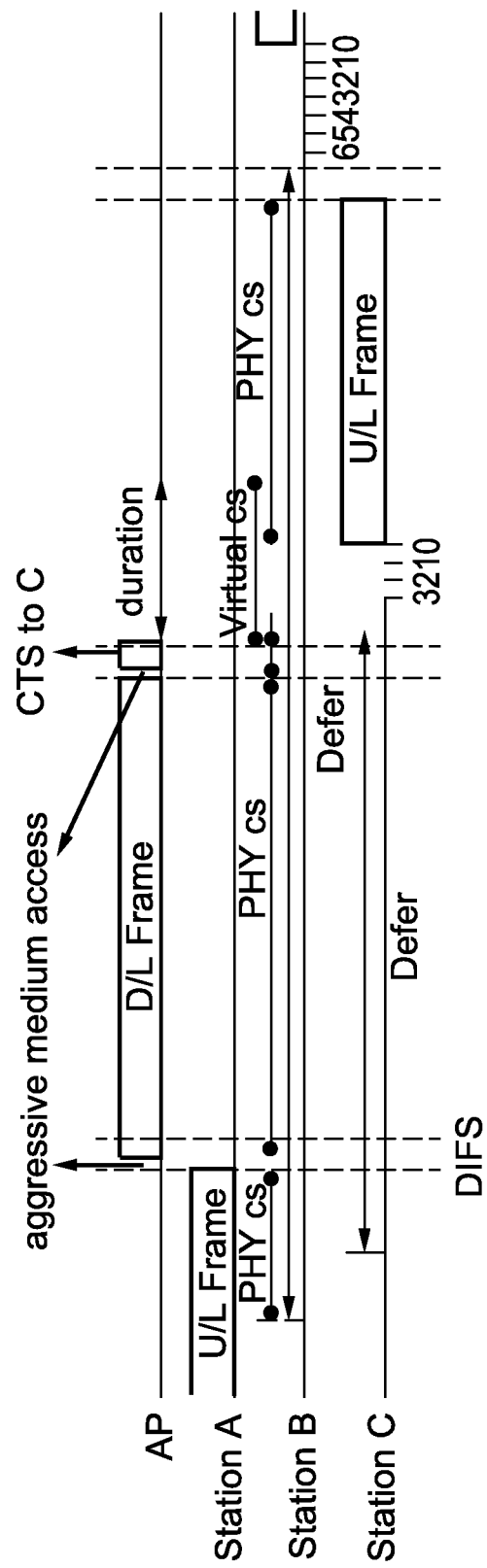
FIG. 3 is an example of medium access by downlink and uplink frames.

As shown in FIG. 3, a frame to be transmitted on a protected downlink is transmitted by the Wi-Fi card of the SHAPE AP with very short deferral time, to gain access to the medium before the stations do (aggressive medium access). Unsolicited CTS frames directed to protected uplink flows are transmitted by the AP using the same aggressive medium access.

In order to understand how uplink reservations based on the unsolicited-CTS work, recall that DCF mandates that upon reception of a CTS frame, an IEEE 802.11 device compares its own address with the receiver address (RA) indicated on the CTS frame, and if they do not match, the station updates its network allocator vector (NAV) with the duration field carried by the CTS frame. By doing so, the station defers transmission for at least the amount of time specified in the CTS duration field (virtual carrier sensing). If the addresses do match the station does not update its NAV and, when the medium becomes free, the station continues to decrement its back-off counter and transmits a packet when a value of zero is reached.

An important aspect of CTS-based reservations for uplink transmissions is the duration of the reservation. The CTS duration field controls station's deferral due to virtual carrier sensing. In case the reserved time interval terminates before the end of the uplink transmission, as shown in FIG. 3, stations will continue deferring only if they detect the medium busy due to physical carrier sensing. In case the transmitting station is hidden from another station in the WLAN, there is a risk of collisions and frame losses. Therefore, to reduce such chances, the uplink profiler logic sets the CTS duration field to the sum of the average uplink frame transmission time and the expected deferral interval, as estimated by the uplink profiler logic.

Figure 16:
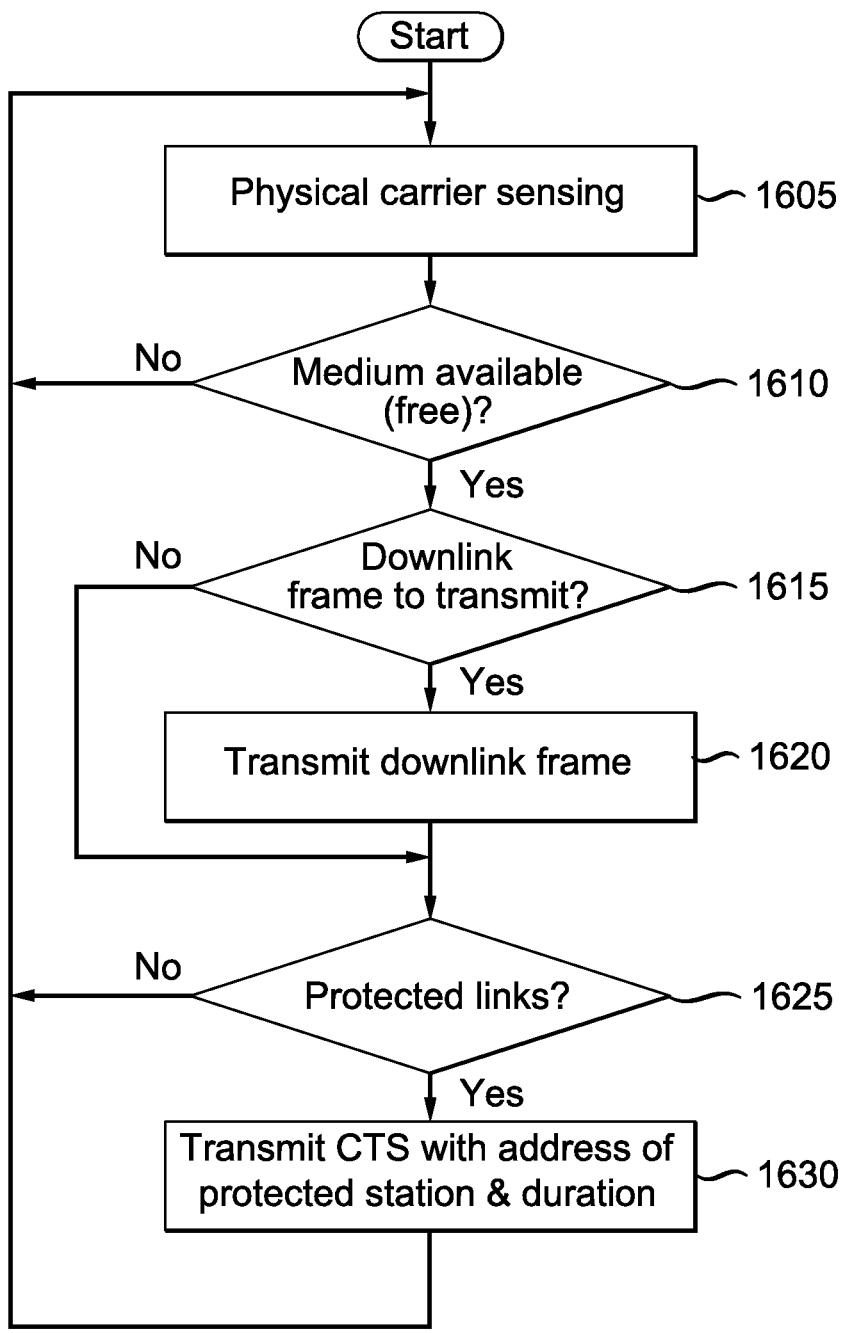
FIG. 16 is a flowchart of an exemplary implementation of the medium access method of the present invention.

FIG. 16 is a flowchart of an exemplary implementation of the medium access method of the present invention. At 1605 the medium access component (module, logic) of the SHAPE AP performs physical carrier sensing. At 1610 a test is performed to determine if the medium is fee (available). If the medium is fee (available), then at 1615 a test is performed to determine if the SHAPE AP has downlink traffic (data, content) to transmit. If the SHAPE AP has downlink traffic (data, content) to transmit then at 1620 the SHAPE AP transmits the downlink data in frames or packets. The downlink data is found in a dedicated FIFO queue maintained by the scheduling logic (module, component). At 1625 a test is performed to determine if there are any protected uplinks (protected links are between the SHAPE AP and a station). If there are any protected uplinks then at 1630, the medium access module (method, component) of the SHAPE AP transmits a CTS frame with the address of a protected uplink and the duration. If there are no protected uplinks, then processing proceeds to 1605. If there are no downlink frames of data (content) to transmit, then processing proceeds to 1625. If the medium is not available, then processing proceeds to 1605.

Specifically, in FIG. 3, station A transmits an uplink frame. The SHAPE AP, station B and station C perform physical carrier sensing and since the SHAPE AP has a downlink frame to send (using a short deferral time—aggressive medium access), the SHAPE AP sends (transmits) its downlink frame followed by a CTS with a duration time. The CTS has the address of station C and is sent (transmitted) once again after a very short deferral time (using aggressive medium access). Since station C is the addresses station, it starts counting down (note the "3210" countdown immediately prior to station C's uplink frame). When Station C's count reaches 0, then station C transmits its uplink frame. Meanwhile, since station B was not addressed in the CTS, station B has updated its NAV and using virtual carrier sensing waits at least the duration specified in the CTS before physical carrier sensing. When station B resumes physical carrier sensing, station C has already started transmitting its uplink frame. Upon completion of station C's uplink frame transmission, the medium is open to all through physical carrier sensing. Since station B has an uplink frame to send (transmit) and no other station is sensed, station B starts its countdown (note the countdown "6543210" at the far right of FIG. 3 and the start of station B's uplink frame transmission.

Whenever the SHAPE AP receives a frame from a protected uplink, the uplink profiler logic updates statistics on this link, such as the average packet size, the average transmission time (derived by frame length and modulation) and throughput (estimated as received bytes per interval of 100 ms). This module also measures the inter-frame time between the transmission of a CTS frame and the start of the transmission of the following uplink frame. A running average of this duration is used as an estimate of the average deferral time by the given station. These on-line updated statistics are then used to dynamically determine and adjust the rate of CTS reservation (as described further below).

Figure 17:
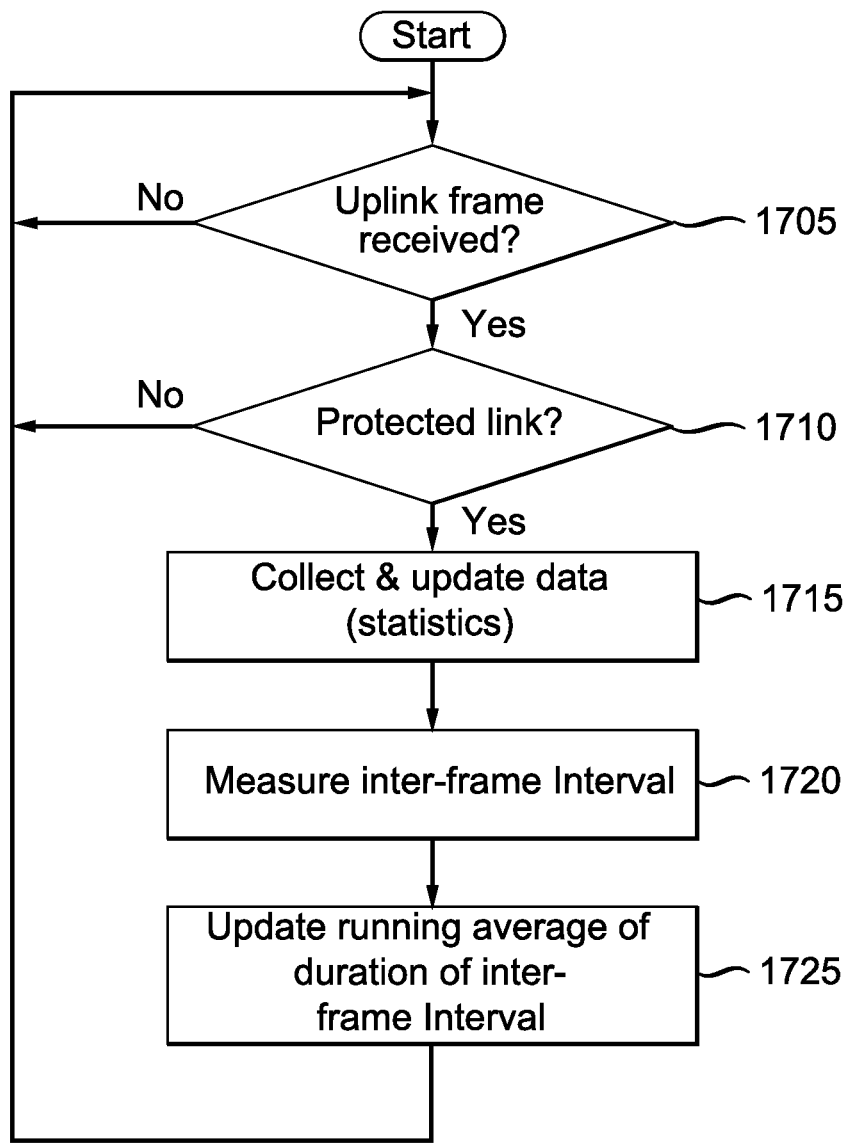
FIG. 17 is a flowchart of an exemplary implementation of the uplink profiler method of the present invention.

FIG. 17 is a flowchart of an exemplary implementation of the uplink profiler method of the present invention. At 1705 a test is performed to determine if an uplink frame has been received. If an uplink frame has been received then at 1710 a test is performed to determine if the uplink frame that was received was from (over) a protected link. If the uplink frame that was received was from (over) a protected link then at 1715 the uplink profiler module (component, method) of the SHAPE AP collects data and updates statistics on this link, such as the average packet size, the average transmission time (derived by frame length and modulation) and throughput (estimated as received bytes per interval of 100 ms). At 1720 the uplink profiler module (component, method) measures the inter-frame interval between the transmission of a CTS frame and the start of the transmission of the following uplink frame. At 1725 a running average of this duration is used as an estimate of the average deferral time by the given station. These on-line updated statistics are then used to dynamically determine and adjust the rate of CTS reservation. If the uplink frame that was received was not on (over) a protected link, then processing proceeds to 1705. If no uplink frame was received then processing proceeds to 1705.

The scheduling logic controls access opportunities of protected links on both the downlink and uplink. The AP maintains a dedicated FIFO queue for each protected downlink and for CTS frames of each protected uplink. All other downlink traffic is stored into a low-priority FIFO queue. FIFO queues are maintained in memory (storage). There may be more or fewer than shown on FIG. 2. For example, there may be a dedicated FIFO queue for the CTS traffic and another FIFO queue for the protected downlink traffic.

SHAPE computes the cumulative time required to transmit all the protected frames in the scheduling cycle (100 ms): the transmission time of downlink frames is obtained by the frame size and the modulation as done by the profiler logic for uplink frames. The airtime consumed by CTS frames is estimated as the time needed to transmit a CTS plus the duration indicated in the duration field of the CTS packet, which is effectively the time allotted to the addressed station to transmit its packet. That is, the CTS's duration is the time indicated in the duration field of the CTS packet, which is the time that all other stations will set their NAV and be silent to permit the protected station to transmit its data packets.

Figure 4:
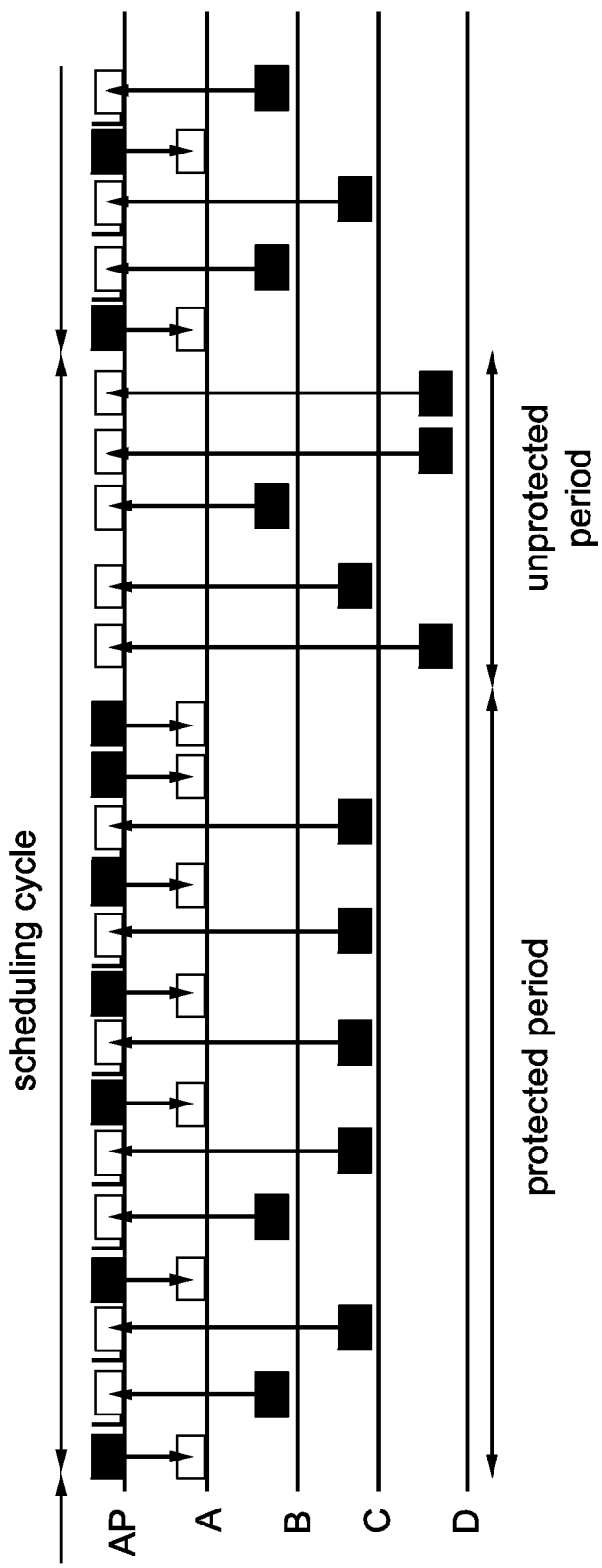
FIG. 4 is an example of SHAPE scheduling medium usage in a WLAN with four stations and three protected links (AP-A, B-AP and C-AP).

The scheduling logic pulls one frame from each protected queue in a round robin fashion. Whenever the cumulative transmission time needed by the protected traffic in a given scheduling cycle is less than the cycle itself, then the scheduling logic pulls from the low priority queue (the non-protected downlink traffic) as many frames as possible to fill in the remaining time. As shown in FIG. 4, this results in each scheduling cycle being divided into two periods.

In the "protected" period, the AP uses aggressive medium access to transmit either CTS or downlink frames. In the "unprotected" period, the AP uses DCF to transmit non-protected downlink frames and competes with other non-protected uplinks. Note that if all downlinks are marked as protected, SHAPE solves the well-known problem of IEEE 802.11 networks where, due to IEEE 802.11's per-station fairness the AP with several outgoing logical links is penalized and obtains a number of accesses to the medium comparable with every other station.

Such time division does not necessarily translate precisely on-air, as the start of uplink packet transmissions still depends on DCF's random back-off, but it is rather used to rate control traffic injected into the Wi-Fi card and detect the need for resource control.

By estimating the length of the protected portion of the scheduling cycle, the SHAPE AP can readily detect when this portion exceeds the length of the cycle itself. This is a clear indication that the system requires more resources than those available (either because a previously inactive or non-protected link became active and protected or because already protected links have lowered their modulation and thus require more airtime). When this happens, SHAPE has to dismiss protection on one link. Although simple policies, such as the dismissal of the link with the highest target throughput, could be used, a MAC-layer aware policy is more desirable. In fact, depending on the wireless channel quality, the amount of time consumed by a link's transmissions can vary widely. Therefore, the SHAPE AP ranks links based on the ratio of their target throughput to usage of air-time. The link with the lowest ratio will then be suspended from protection. The rationale behind this logic is that a link having one of the lowest target throughputs, but one of the highest airtime consumption, is affecting the home WLAN much more than it should or any of the other links. In other words, between two links having the same target throughput but different airtime usage, the SHAPE AP will dismiss protection of the link with highest airtime consumption.

Figure 18:
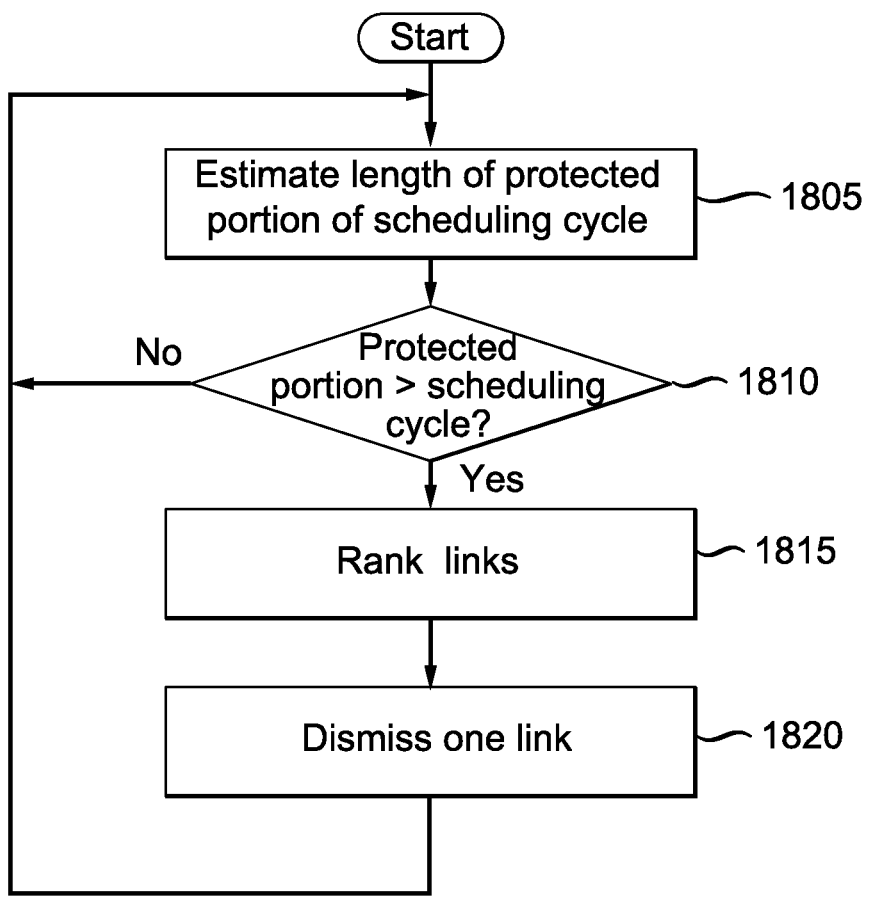
FIG. 18 is a flowchart of an exemplary implementation of the scheduling method of the present invention.

FIG. 18 is a flowchart of an exemplary implementation of the scheduling method of the present invention. At 1805 an estimate of the length of the protected portion of the scheduling cycle is made. At 1810 a test is performed to determine if the protected portion of the scheduling cycle is greater than the length of the scheduling cycle. If this is true then a protected uplink must be dismissed as part of resource control. If the protected portion of the scheduling cycle is greater than the length of the scheduling cycle then at 1815 the protected uplinks are ranked. This is done by dividing the target throughput by the air time usage. The protected uplink with the lowest ratio will be the uplink to be dismissed. At 1820 one protected uplink is dismissed. Processing then proceeds to 1805. If the protected portion of the scheduling cycle is less than or equal to the length of the scheduling cycle, then processing proceeds to 1805.

Figure 19:
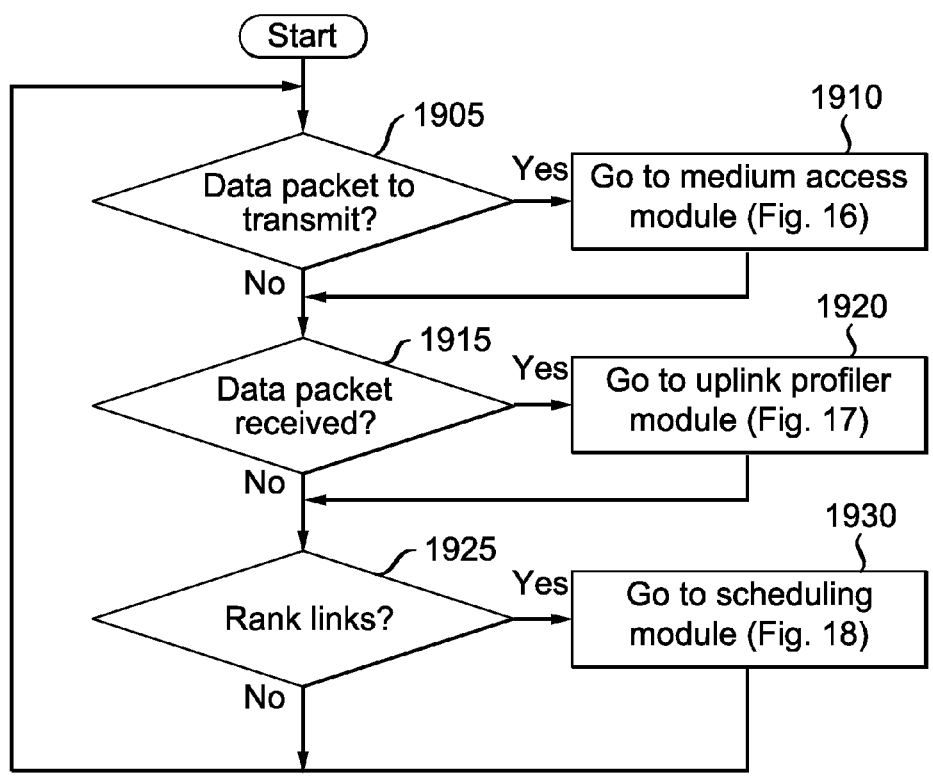
FIG. 19 is an overview flowchart of the operation of an access point in accordance with the principles of the present invention.

FIG. 19 is an overview flowchart of the interaction of the medium access module (FIG. 16), the uplink profiler module (FIG. 17) and the scheduling module (FIG. 18). In actual functionality, the medium access module, the uplink profiler and the scheduling module may run (be executed) independently as needed. At 1905, a test is performed to determine if the access point has one or more data packets to transmit. If the access point has one or more data packets to transmit, then at 1910 processing proceeds to FIG. 16 (medium access module) and then returns to FIG. 19. At 1915, a test is performed to determine if the access point received an uplink data packet. If the access point received an uplink data packet, then at 1920 processing proceeds to FIG. 17 (the uplink profiler module) and then returns to FIG. 19. At 1925, a test is performed to determine if the access point should rank the links. If the access point should rank the links, then at 1930 processing proceeds to FIG. 18 (scheduling module) and then returns to FIG. 19.

The frequency of transmissions opportunities for each protected uplink is controlled through the transmission of unsolicited CTS frames. Ideally, for each transmitted CTS an uplink frame follows and is received. The average uplink packet length and the link's target throughput are used to calculate the link's required rate of frame transmissions and thus, the rate of CTS frame transmissions to be sent by the SHAPE AP. Therefore, the scheduler adapts dynamically to changes in the packet size.

Whenever the on-line estimation of an uplink's throughput is lower than its target, the SHAPE AP infers that the link may be suffering from MAC layer transmission failures (although the SHAPE AP's CTS-based medium access minimizes collisions of protected frames, the wireless channel is inherently lossy). In this case, the CTS rate is increased proportionally to the ratio between the target throughput and the obtained (actual) throughput. In an attempt to avoid starvation of unprotected traffic unless unprotected traffic starvation is really necessary, this CTS rate increase is bounded by a number of CTS frames per scheduling cycle such that their (CTS frames) cumulative transmission time uses up no more than half of the non-protected portion of the previous scheduling cycle. Moreover, to minimize the amount of unnecessary and thus wasted reservations, SHAPE monitors the number of uplink frames on a protected uplink received during the unprotected portion of a cycle and, if the target throughput is met, reduces the number of CTS frames accordingly. The rationale behind this is that, as the station manages to acquire the medium by the means of legacy DCF, some CTS frames are going unused. This is likely to happen when the WLAN is lightly loaded.

Figure 5:
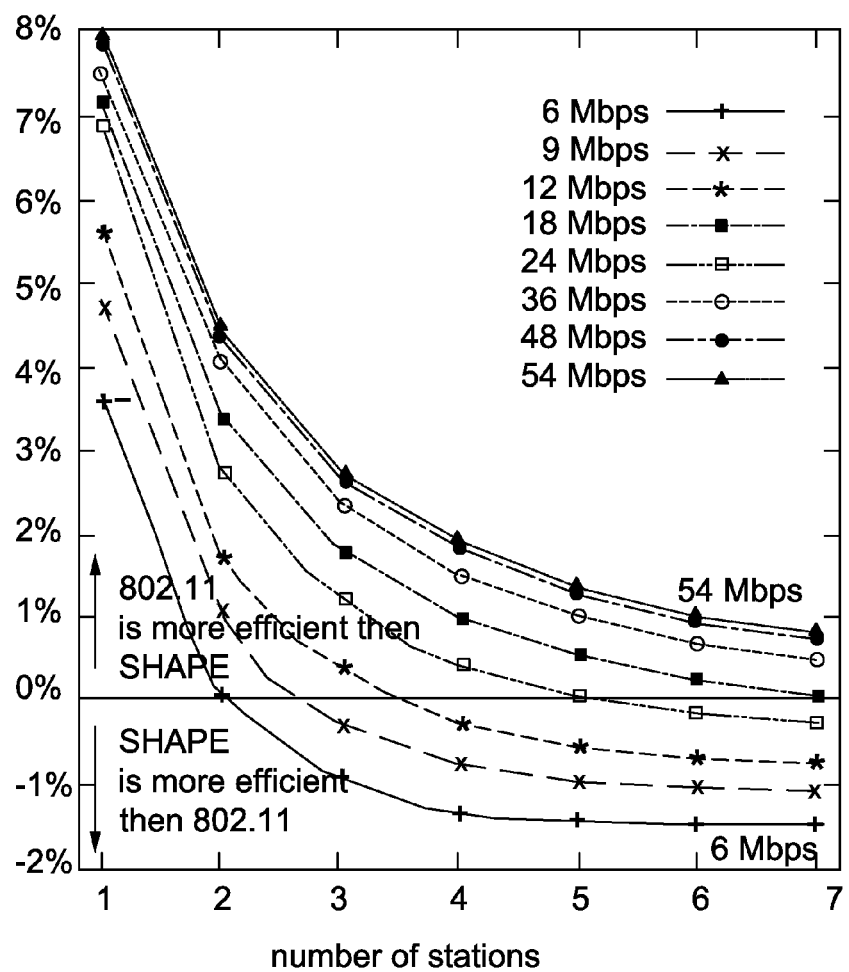
FIG. 5 shows normalized difference of saturation throughputs per station [(IEEE 802.11−SHAPE)/modulation rate].

The SHAPE AP's modified medium access protocol transmits a CTS frame for every uplink frame and therefore, may incur in an overhead larger than that of IEEE 802.11 DCF. Protocol overhead is denominated the airtime used for the transmission of control frames and the contention time (i.e., random back-off). SHAPE's overhead is compared against that of DCF by comparing the saturation throughputs obtained by a generic station in a network with N stations with saturated uplinks. In the case of SHAPE, the AP transmits one CTS to each station in a round-robin fashion. SHAPE's saturation throughput is modeled as $\hat{P}/X$, where $\hat{P}$ is the payload of each packet and X is the time consumed by a 'CTS|DATA|ACK' frame exchange. SHAPE's saturation throughput is compared with the saturation throughput estimated by Bianchi's model for IEEE 802.11 DCF. The two models were solved numerically for IEEE 802.11a PHY and MAC parameters and a payload size of 1498 Bytes, for all the possible modulation rates. See FIG. 5.

The difference between SHAPE's aggregate saturated throughput and that of IEEE 802.11 DCF, is higher for higher modulation rates, and never exceeds 10% of the modulation rate. The difference between SHAPE's per station throughput and that of IEEE 802.11 DCF falls quickly below 3% of the modulation rate, for as few as three saturated stations at any modulation rate. For low modulation rates SHAPE's overhead can be even smaller than that of IEEE 802.11 DCF, yielding to higher available bandwidth, e.g., at 6 Mbps, in a network of 5 stations, the difference between SHAPE's aggregate throughput and that of IEEE 802.11 DCF, is 480 Kbps (8% of the modulation rate) higher.

Up to this point, SHAPE's design has been described while focusing on a single AP controlling a set of associated stations. However, home networks in urban areas face coexistence problems, sharing the air medium with tens of other APs, some of which operate on the same channel.

An important feature of the medium access mechanism adopted by SHAPE is that, being based on the virtual carrier sensing mechanism, it works across the boundaries of a logical WLAN: CTS frames do not belong to a specific WLAN, and are decoded by any IEEE 802.11-compliant device in range of the transmitting device, which in the present invention is the AP. Therefore, a SHAPE AP is able to "clear" the medium around it and effectively guarantee throughput requirements to its stations.

For our experimentation setup, SHAPE's core functionalities are implemented on a Linux PC equipped with an Atheros AR5212 Wi-Fi card driven by MadWifi6, as this setup is widely used in the community. The AP logic is implemented using the Click Modular Router as the basic AP functionalities, such as beaconing, association, etc., are readily available. Click receives raw Wi-Fi frames with Radiotap headers from a MadWi-fi monitor interface and crafts (creates, generates) Wi-Fi frames that inject in the same monitor interface. Beyond SHAPE's proper functionalities, Click is extended in order to allow the relay of frames from a Wi-Fi device to another one.

Normally, CTS generation is performed by the wireless card itself in reply to a RTS, or before transmitting a DATA frame for which the driver has requested CTS-to-self protection. In contrast, the present invention (the SHAPE AP) generates (crafts, creates) CTS frames in software and injects them into a raw interface; the Atheros card transmits the CTS frames while being unaware of the frame's content and thus it does not update its own NAV. As a result, whenever the AP's card transmits a CTS frame, if the card's transmission queue is not empty it will aggressively transmit again, during the "reserved" time. This issue was minimized by configuring the card so that the transmission queue is disabled after each CTS frame transmission and an interrupt is triggered. The Atheros driver was modified so that the queue is re-enabled in an interrupt handler, after waiting the amount of microseconds written in the CTS frame's duration field, minus the average interrupt handling time, empirically estimated. Such modifications are expected for an experimentation test bed, and in SHAPE's implementation into a wireless card, they would be avoided.

The effectiveness of the present invention was assessed by monitoring the inter-frame gap of CTS frames transmitted by an AP having a never-empty queue of CTS frames. In this condition, the AP continuously attempts to access the medium with short deferral interval. A perfect AP silencing solution would prevent the AP from accessing the medium before the time reserved by each transmitted CTS frame is elapsed. Thus, the minimum inter-frame would equal the reservation plus a SIFS interval. Controlled experiments, where the AP operates on a free channel (no other transmitters are active) were performed. This solution was tested under different loads, in order to verify that the load does not affect the precision of the pause interval. Bursts of 20 frames every 1 ms, 10 frames every 1 ms, 4 frames every 400 μs and 2 frames every 400 μs were used. Experiments with four different CTS reservation durations of 100 μs, 500 μs, 1 ms and 1.5 ms were conducted. For each of these 16 experiments more than 5000 frames were transmitted (sent, forwarded). In each of the experiments, less than 6% of the inter-frame gaps are shorter than the CTS duration field plus a SIFS. As this solution imposes a significant load on the CPU the current prototype does not work properly with uplink modulation rate above 6 Mbps. With the increased number of CTS frames to transmit, the Click router is unable to fetch all the received frames from the driver.

Despite these limitations, SHAPE is effective in allocating uplinks the demanded bandwidth, and thus it is expected that a native implementation of SHAPE on the wireless card will perform even better.

Figure 6:
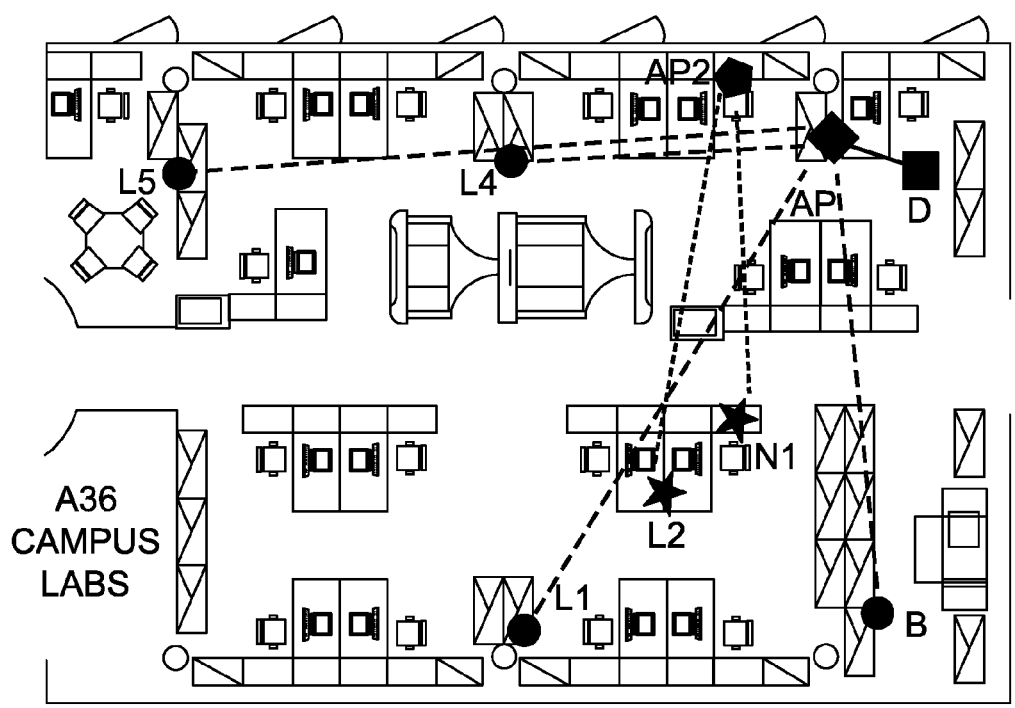
FIG. 6 shows the test bed layout.

SHAPE was deployed on a test bed representing a typical home network with multiple wirelessly connected devices and with cross traffic from a neighboring network. The home network includes three laptops and one mini-ITX PC associated with a desktop PC operating as access point. All these devices feature Atheros cards (AR5212—dual band), equipped with omni-directional antennas. Another desktop PC is connected to and in communication with the AP on the Ethernet backbone, representing the home Ethernet LAN. The neighboring WLAN includes one laptop and one netbook associated with a mini-ITX PC operating as the SHAPE AP. The home network's AP runs either SHAPE or plain IEEE 802.11. The test bed layout is shown in FIG. 6. The test bed is deployed on a single floor, in an open space office, except for L5 which is in a glass-enclosed office. In between L4 and L1 there are two glass-enclosed small meeting rooms. The test bed operates in the 5 GHz band (IEEE 802.11a). This is a reasonable scenario for home networks, with up to eight concurrently active devices competing for access to the same channel.

The SHAPE WLAN is first studied while the neighbor AP is not active. The uplink protection, as controlling how legacy IEEE 802.11 stations access the medium, is studied since this is SHAPE's most challenging feature. Next 2-hop protection, suited especially for multimedia streams from a wireless media server to a wireless device in the home, is studied. Then, SHAPE's behavior when the neighbor legacy IEEE 802.11WLAN is active and competing for medium access is studied next. All the results shown below are the average of 10 repetitions of the same experiment, and the error bar in each graph is the standard deviation of the corresponding metric.

All devices in the test bed are on channel 64 (5.320 MHz), in the absence of external interference, and use a fixed modulation of 6 Mbps. The use of a fixed modulation allows us to compare the average aggregate throughput of all active stations in a set of experiments as a metric of bandwidth utilization, i.e., if the use of either IEEE 802.11 or SHAPE leads to a much higher aggregate throughput it means the two protocols have a different bandwidth utilization efficiency. Under variable transmission bit rate the available bandwidth varies with each station's behavior and would not allow the comparison to be made. Although the choice of 6 Mbps is mandated by technical limitations of the prototype, SHAPE itself can be used in conjunction with a rate adaptation algorithm.

CBR UDP flows are used to represent multimedia flows, and TCP flows are used as concurrent non-protected traffic, representing competing web and streaming traffic. Experiments were also performed where unprotected links carry bandwidth demanding UDP flows, and SHAPE was validated to work even when the medium is very congested. An instance of these results is shown below. The TCP and UDP flows are generated using iperf's default settings.

Below SHAPE's effectiveness in the protection of uplinks and 2-hop links, as well as its ability to protect links with heterogeneous target throughputs, is shown.

SHAPE's ability to reserve a portion of the available bandwidth to a single protected uplink is evaluated first. The link between the laptop L5 and the AP (from now on such link is referred to as L5-AP, and likewise for the other stations). During the experiment L5 was instructed to send a CBR UDP flow of 4 Mbps to the wired machine D via the SHAPE AP. This represents a real-life scenario where a wireless media server (like a tablet or mobile phone) streams an MPEG-2 video to a set-top-box. Concurrently to L5, the other stations compete for medium access. Each of these stations initiates a TCP connection towards D via the AP.

Figure 7:
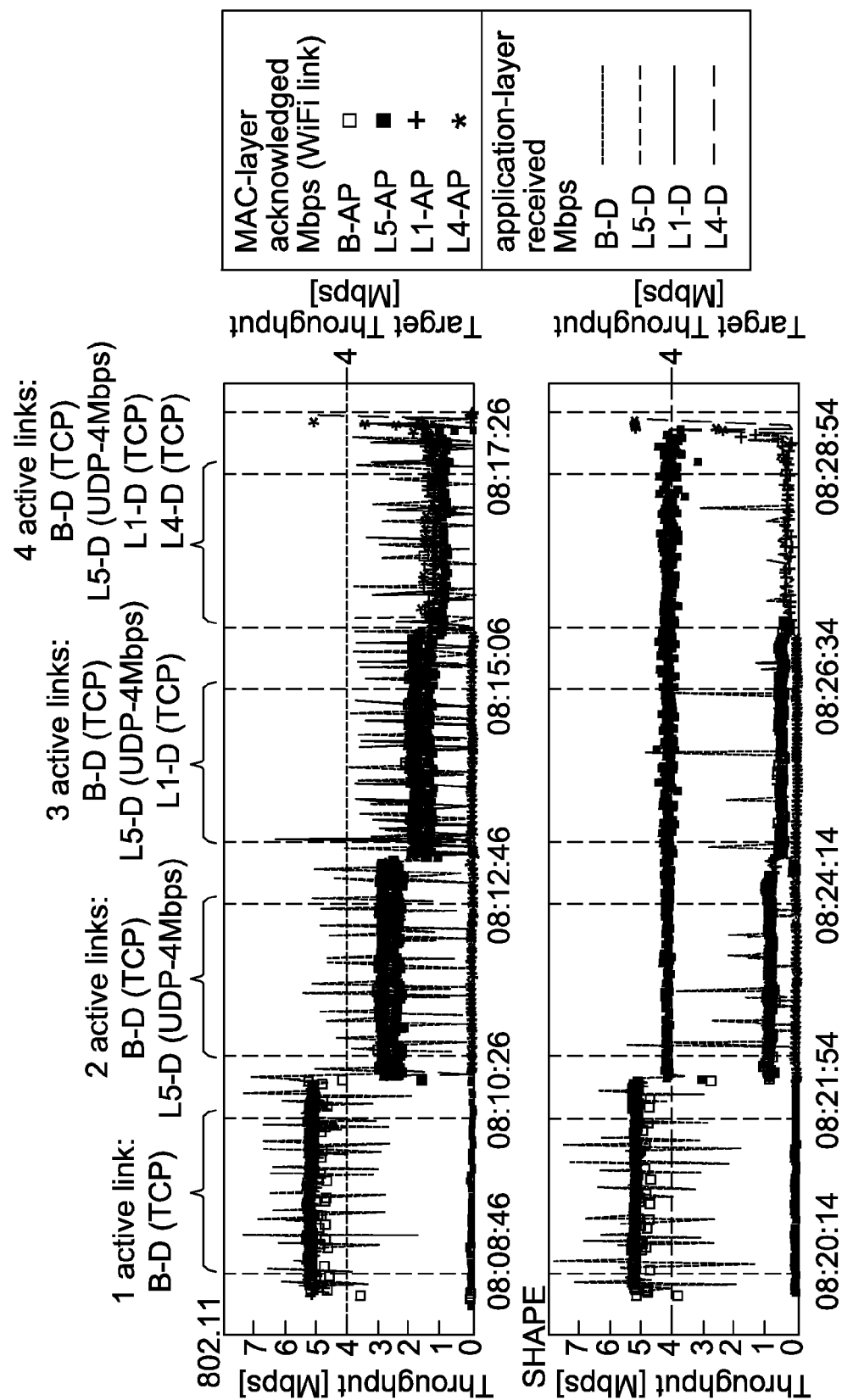
FIG. 7 shows the efficacy of SHAPE's uplink protection for an increasing number of concurrently active transmitters.

The top plot of FIG. 7 shows the throughput (at MAC and application layers) obtained by each uplink using IEEE 802.11, while the bottom plot shows the same metrics with SHAPE. Unlike the remaining plots which show throughputs averaged over 10 repetitions, this plot compares the timelines of two single experiments. This is used not only to show how each experiment is performed, but also to illustrate how SHAPE works in details.

The first link to start is a non-protected uplink from the Wi-Fi station B to the wired desktop D. It obtains about 5 Mbps of application layer bandwidth. Note that the application layer throughput (dashed line) shows large spikes, while the MAC-layer throughput of the Wi-Fi uplink (square points) is quite stable, confirming that TCP keeps the Wi-Fi cards' transmission queue non-empty. Inspection of an over-the-air packet capture of the experiment verifies that the spikes are triggered by TCP CUBIC's behavior. Often, one TCP packet is lost, yet many of the following packets are delivered. When the missing segment is retransmitted, all already received data at the network layer (up to few Mbits) is delivered at once to the application layer.

After about 2 minutes, the protected link is started (L5-AP). With standard IEEE 802.11 the two active links share the available bandwidth. With SHAPE, the protected link obtains a stable throughput equal to its target rate (4 Mbps). As the number of contending transmitters increases, the throughput of the protected link under SHAPE does not change significantly.

Figure 8:
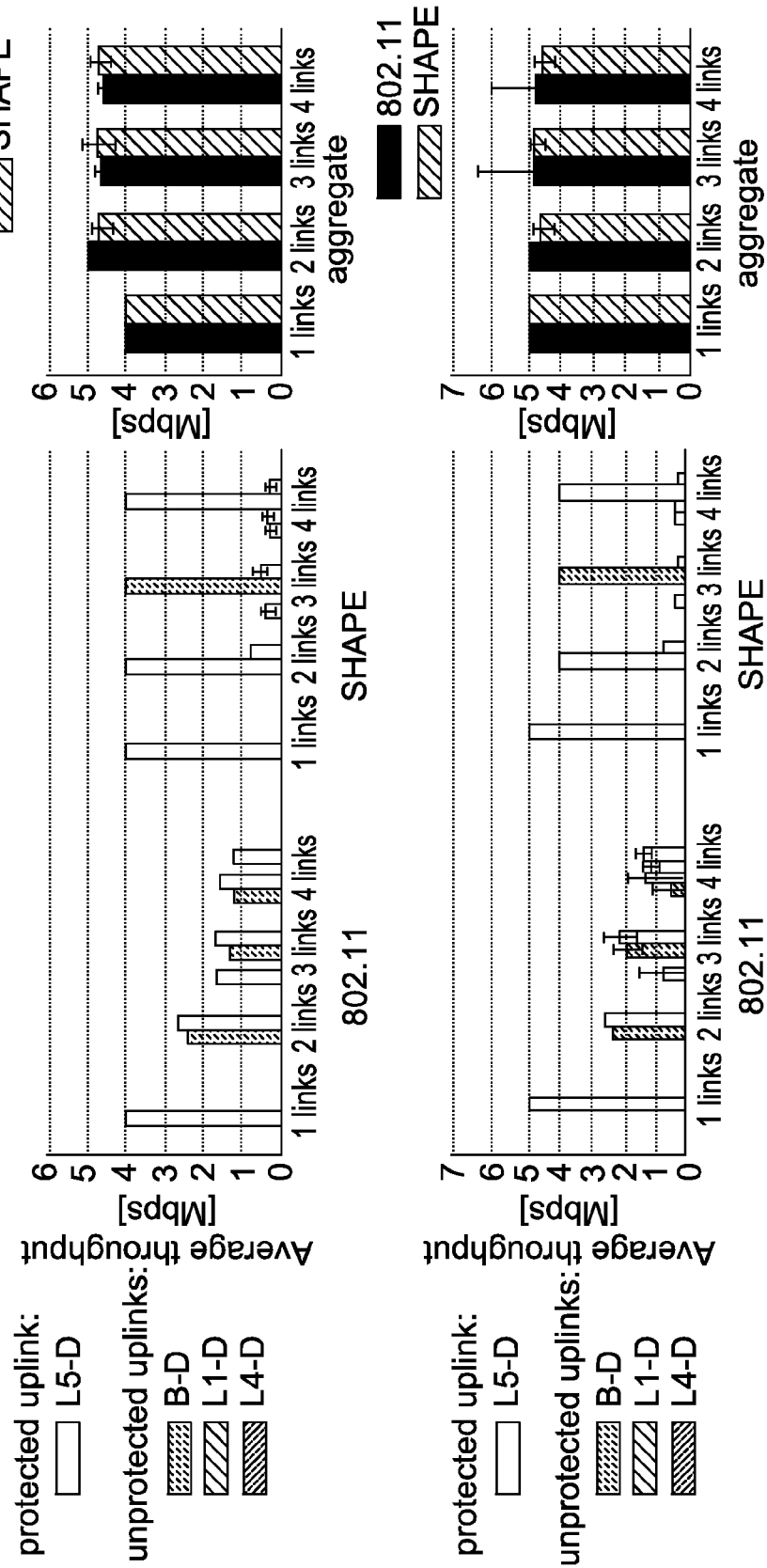
FIG. 8 generally shows the efficacy of SHAPE's uplink protection for an increasing number of concurrently active transmitters.

FIG. 8 shows the average throughput obtained by each uplink in 10 repetitions of the same experiment, with and without enabling SHAPE's uplink protection. Moreover, the same set of experiments is performed with the protected link to start first. The results are consistent, showing that SHAPE effectively guarantees the target throughput to a protected link whether this link becomes active before or after concurrent traffic.

The rightmost bars in FIG. 8 compare the aggregate throughput (the sum of the average throughput of all the active links) obtained with IEEE 802.11 and SHAPE. FIG. 8 confirms that SHAPE does not starve non-protected traffic more than what is strictly needed and achieves a comparable network utilization as IEEE 802.11.

Figure 9:
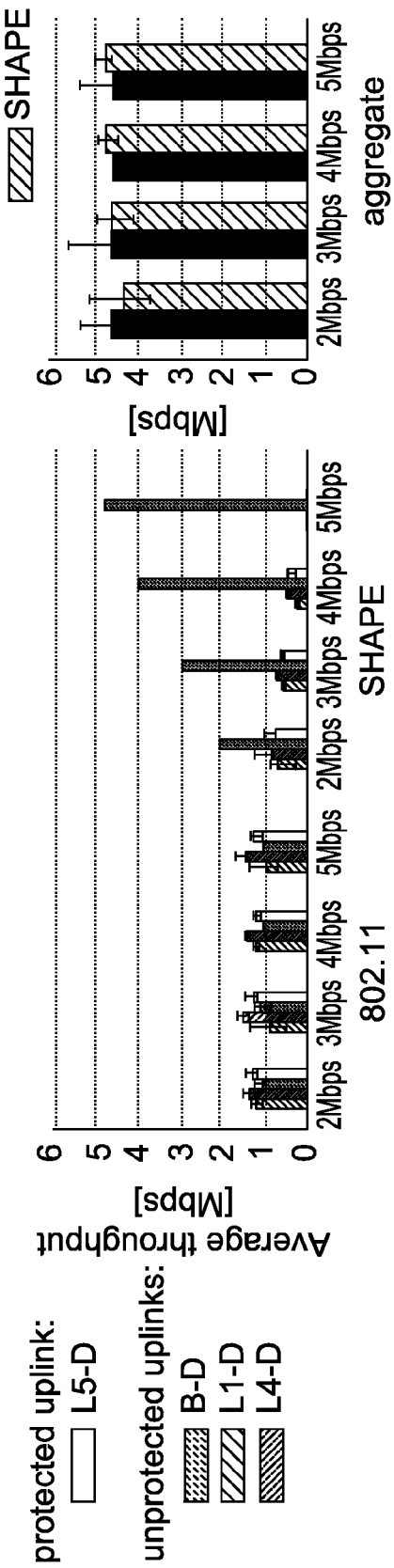
FIG. 9 shows the efficacy of SHAPE's uplink protection for different target bit rates and three concurrently active links.

In order to assess SHAPE's ability to protect different portions of the available bandwidth, the same experiment is repeated for different target bitrates. FIG. 9 shows the average throughput obtained by each uplink when L5-AP carries a CBR UDP flow of 2, 3, 4 and 5 Mbps and it is protected accordingly and while the other 3 stations are active (with a TCP flow each towards D). SHAPE effectively protects the link L5-D reducing the airtime left to other stations accordingly. It is noted that when the target bit rate is 5 Mbps, the average throughput is 4.73 Mbps, as the requested throughput is beyond the total available bandwidth. This limitation on the available bandwidth can be deduced by the fact that the aggregate throughput achieved by either IEEE 802.11 or SHAPE is less than 5 Mbps due to inherent overhead in IEEE 802.11-based systems (the rightmost bars in FIG. 9).

Figure 10:
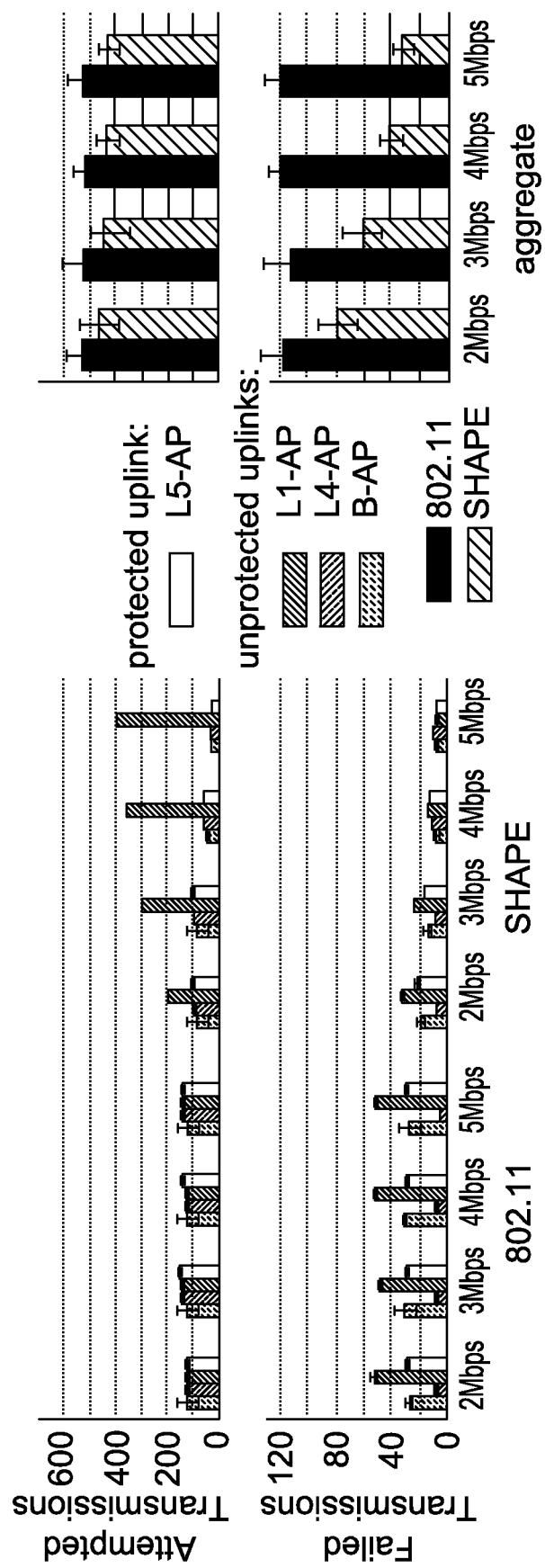
FIG. 10 is a comparison of transmission attempts and failures under IEEE 802.11 and SHAPE in the set of experiments shown in FIG. 9.

FIG. 10 shows the average number of transmission attempts and failures per link in the above experiments. Two significant observations can be made. SHAPE clearly accords more transmission opportunities to the protected link, the increase depending on the level of requested protection. In contrast, all links have an equivalent number of attempted transmissions with IEEE 802.11. This is expected due to the IEEE 802.11 per-station fairness principle. The second observation relates to failed transmissions, which are relatively high for all links under standard IEEE 802.11. However, with SHAPE, the number of failed transmissions for all stations is reduced. This is a result of reducing collisions through reservations by CTS frames. These results show that SHAPE not only manages to provide a protected link with more transmission opportunities, it also improves the overall throughput by reducing the number of failed transmissions.

SHAPE's ability to protect several uplink streams with heterogeneous target throughputs was evaluated next. A scenario with two protected and two non-protected uplinks was considered. The protected links L5-D and L1-D have target bitrates of 2.6 Mbps and 1.4 Mbps respectively, for CBR UDP flows. This scenario represents a regular SD-TV stream and a low resolution SD-TV stream. Each of the non-protected uplinks carries a TCP flow towards D each.

Figure 11:
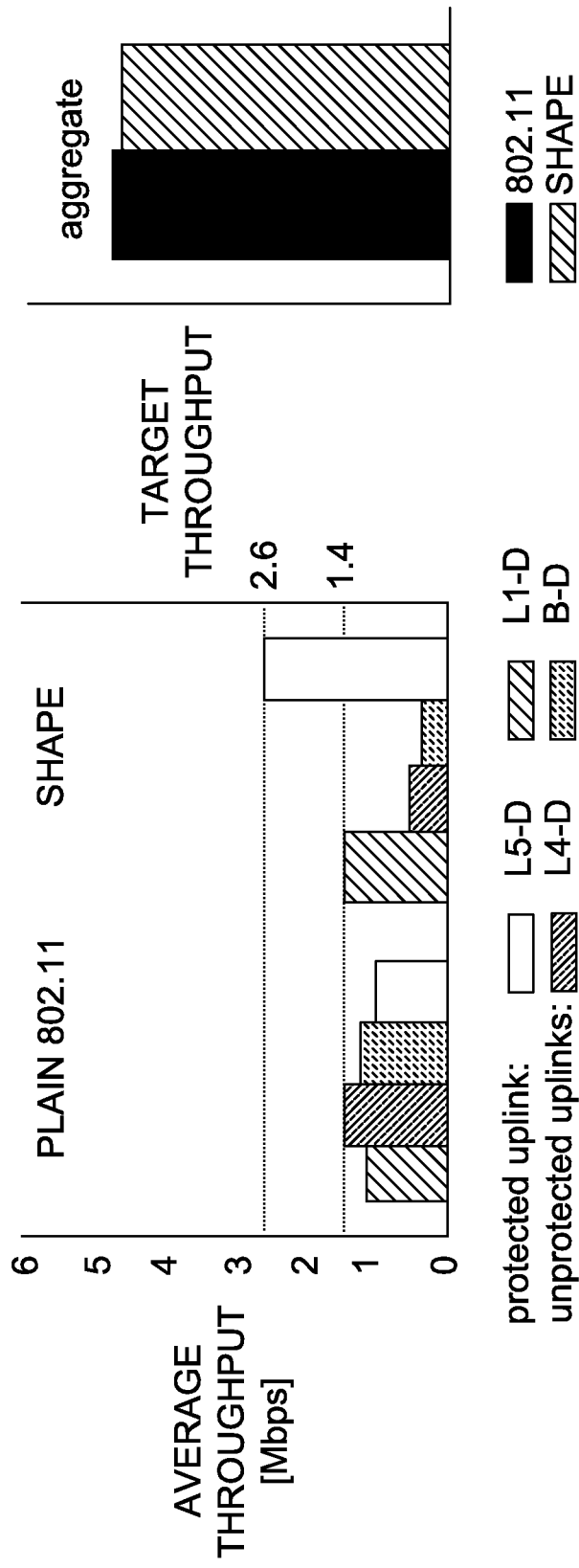
FIG. 11 shows the efficacy of SHAPE in protecting different uplinks with heterogeneous target bit rates.

FIG. 11 shows the average throughput obtained by each uplink across 10 repetitions of the experiment. When SHAPE is enabled, the two protected uplinks consistently achieve their respective target throughput. Without SHAPE, all uplinks share the available bandwidth equally and the target throughput rates are not reached. This result confirms that the scheduling algorithm setting CTS frame parameters works as it should and protects the target throughput specified for each link.

Figure 12:
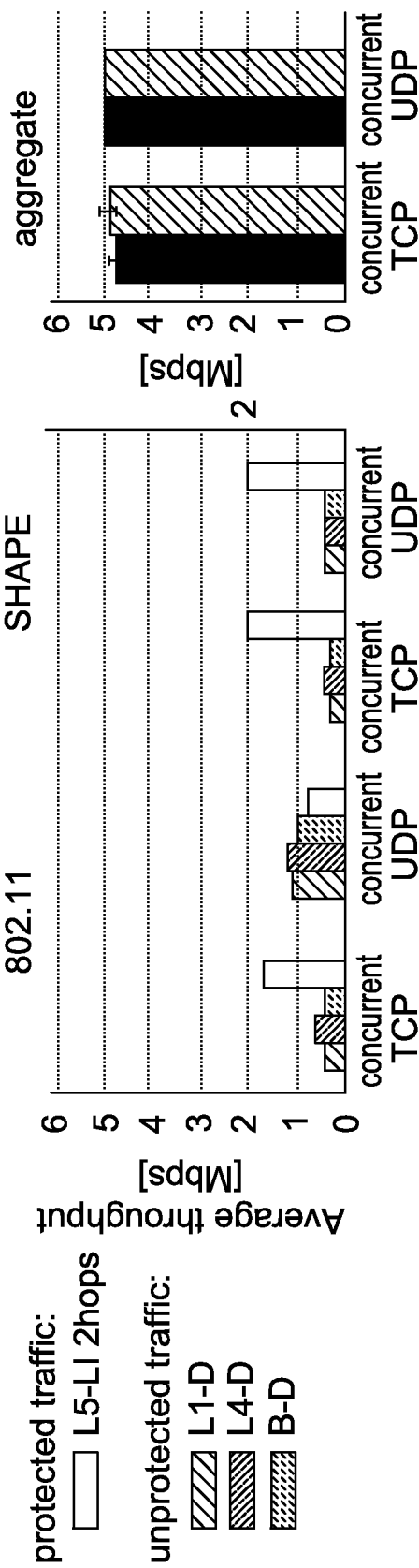
FIG. 12 shows the efficacy of SHAPE's two-hop protection for an increasing number of concurrently active transmitters.

A scenario with a protected 2-hop link, e.g., a wireless media server streaming a video to a wireless set top box, was considered next. In IEEE 802.11, the wireless communication from a station to another station is relayed at the AP. In the home networking scenario in which the present invention operates (functions), both the uplink and the downlink must be protected. A CBR UDP flow of 2 Mbps from station L5 to station L1 (that are referred to as L5-AP-L1), thus requiring 4 Mbps on the air, was considered next. Non-protected uplinks to the wired computer D via the AP were also initiated. Two experiments were performed. One experiment was performed where the concurrent non-protected uplinks carry TCP flows. A second experiment where the links carry CBR UDP flows of 6 Mbps was also performed. FIG. 12 shows the average throughput obtained by each active link. In both cases, SHAPE is able to provide the 2-hop protected flow with the required 2 Mbps throughput while regular IEEE 802.11 is not able to provide the required bandwidth. It should be noted that under standard IEEE 802.11 TCP flows the protected link nearly reaches its target throughput while the TCP flows obtain only low data rates. This is n effect of TCP's rate control scheme, which throttles the source rate, as the TCP ACKs on the non-protected downlinks do not obtain sufficient transmission opportunities.

On the right side of the plot of FIG. 12 the aggregate throughput is reported, (note that the 2hop link is summed twice as it requires each packet to be relayed at the AP). Any overhead incurred by SHAPE is indeed negligible as the aggregate throughput is comparable with that of standard IEEE 802.11.

So far, SHAPE has been shown to effectively provide protected links with the required throughput. This however, may not be sufficient to produce a good quality of experience when streaming a live video. If live video is streamed with a small receiver buffer, the quality of the video decreases with increasing jitter values (when the decoder needs data that has not been received yet, the decoding fails).

Figure 13:
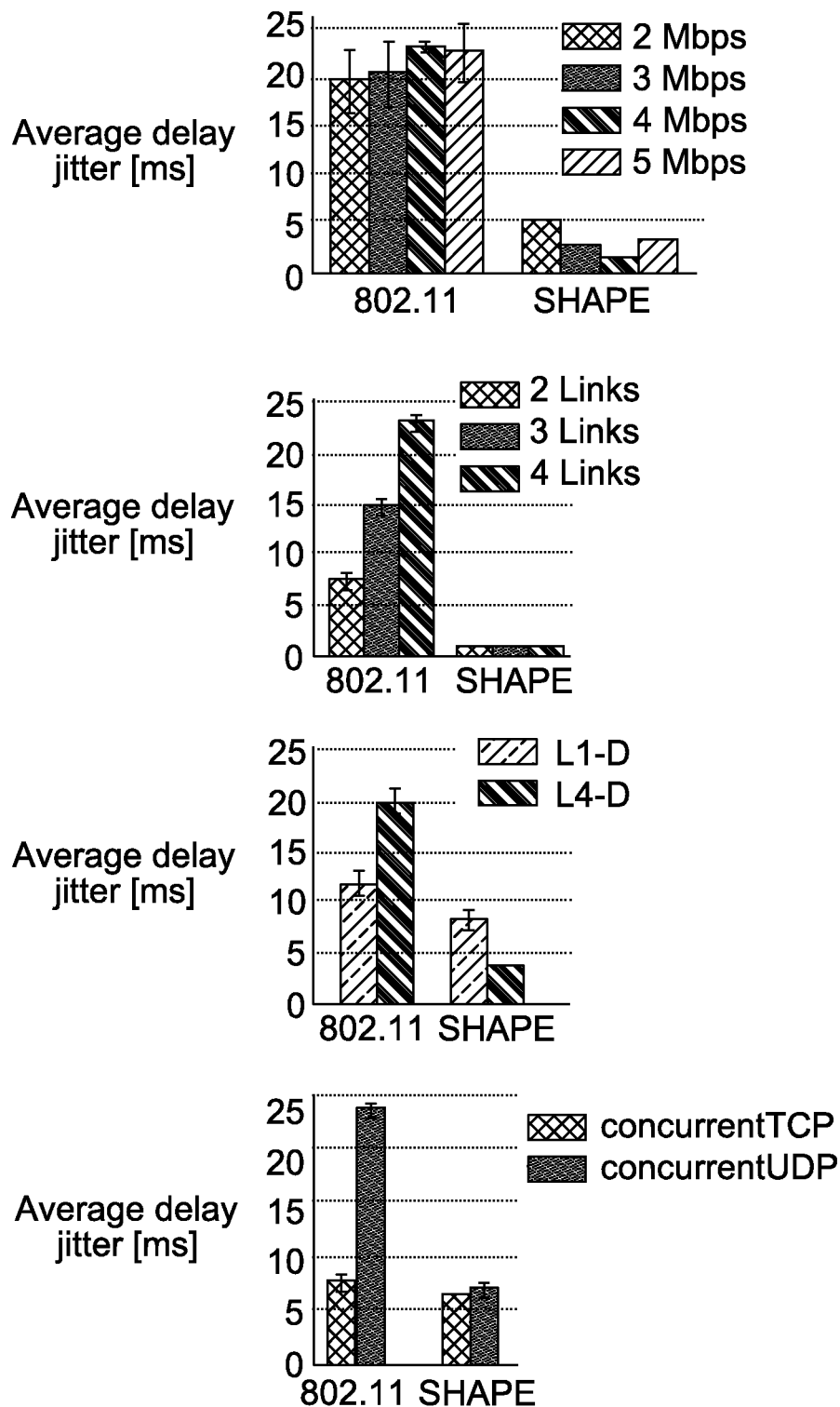
FIG. 13 shows a single SHAPE WLAN and delay jitter of the protected link(s).

Therefore, the delay jitter of the protected links in the experiments discussed so far was analyzed. FIGS. 13(a) and 13(b) compare the delay jitter that the protected link L5-D experienced under IEEE 802.11 and SHAPE in the same set of experiments discussed above. For all target throughputs and for 1 to 3 concurrently active TCP links, SHAPE not only provides the protected link with the required throughput, but also with up to 10 times less jitter than IEEE 802.11.

FIG. 13(c) compares the delay jitter of the protected links L1-D and L4-D with heterogeneous target throughputs, discussed above. Again, in this case, SHAPE reduces the delay jitter experienced by the protected link to less than 10 ms.

FIG. 13(d) compares the delay jitter experienced by the 2-hop protected flow L5-AP-L1, discussed above. The use of SHAPE considerably reduces the jitter experienced by the protected link, especially in case of concurrent UDP links.

Next SHAPE's effectiveness in the realistic case where another WLAN is active in the neighborhood was considered. In such a case, the home network's devices compete for medium access with other devices external to the home network itself.

First, SHAPE's ability to reserve bandwidth with a single protected uplink (L1-AP) of a target throughput of 4 Mbps is tested. While L1-AP is active, the other three uplink connections in the WLAN carry TCP streams towards D via the AP. Moreover, the links between the two stations associated with the second AP also carry an uplink TCP connection each.

Figure 14:
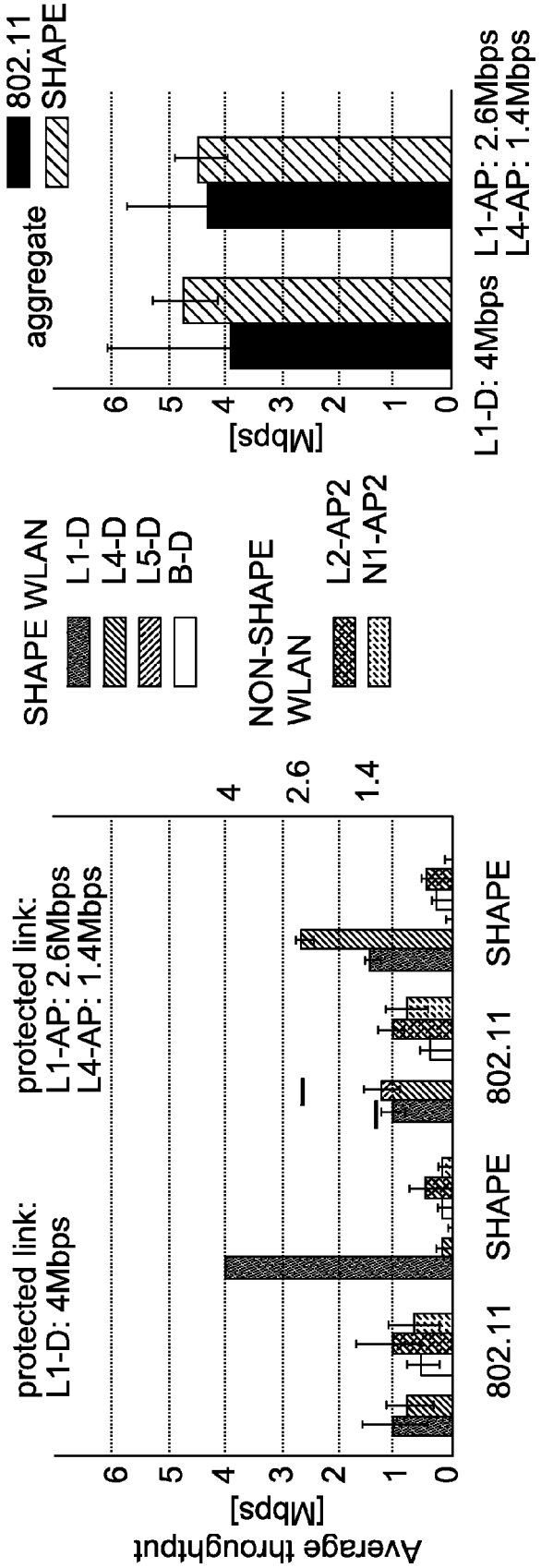
FIG. 14 shows the efficacy of SHAPE's uplink protection in the presence of a non-SHAPE WLAN co-located with the SHAPE test bed.

The leftmost bars in FIG. 14 compare the average throughput of each active link obtained when SHAPE is respectively disabled and enabled. Despite the presence of five concurrent TCP uplinks, two of which belong to a different WLAN than the protected link, SHAPE effectively provides this link with its target throughput of 4 Mbps.

Second, SHAPE's ability to protect several uplinks with heterogeneous target throughput is verified. The middle group of bars in FIG. 14 compares the average throughput of each active link in the case where L1-AP (protected) carries a CBR UDP flow of 2.6 Mbps towards D, while L4-AP carries a CBR UDP flow of 1.4 Mbps towards D. Meanwhile, the other four stations (two are associated with the SHAPE AP and the other two with the co-located IEEE 802.1 AP) carry a TCP connection each towards their respective AP. SHAPE is again effective in guaranteeing the protected links with their respective target throughput, despite the activity of transmitters competing with the SHAPE WLAN.

The rightmost bars show the aggregate throughput obtained by all active stations. As well as in the previous experiments, the use of SHAPE does not introduce an extra overhead and achieves the same or higher bandwidth utilization compared to IEEE 802.11.

Figure 15:
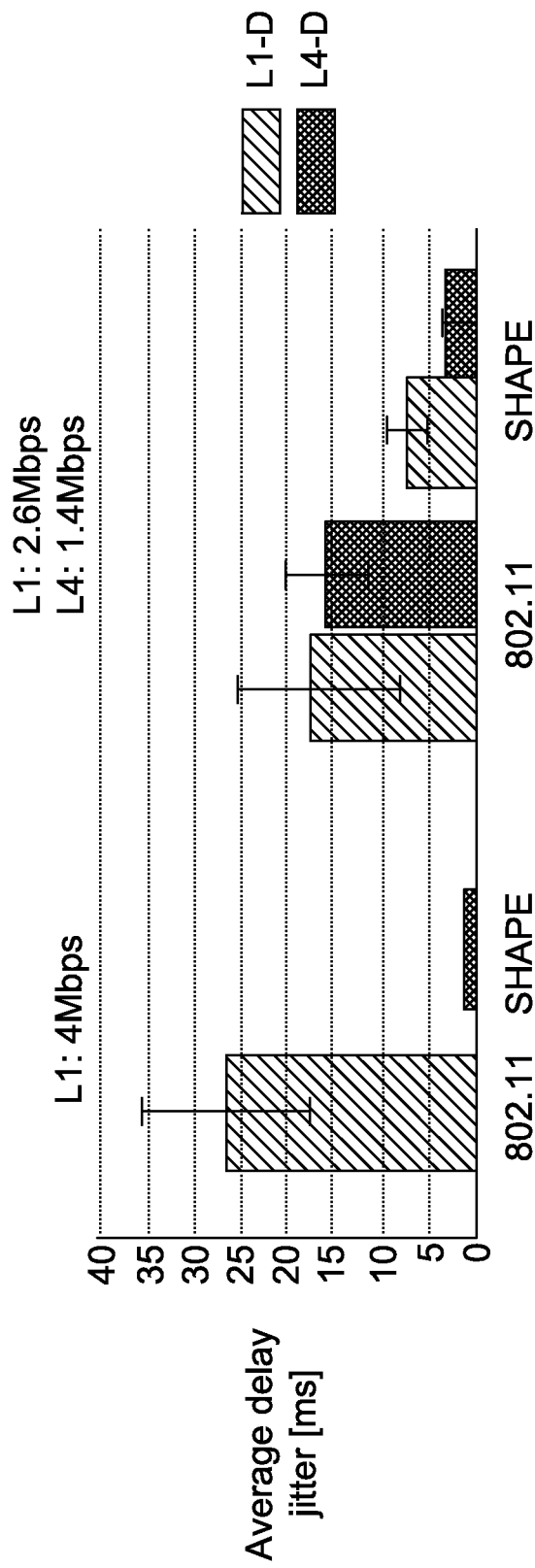
FIG. 15 shows SHAPE's effectiveness in the presence of a neighbor WLAN and the delay jitter of the protected links.

Last, the delay jitter experienced by the protected link(s) in the above scenarios is analyzed. As shown in FIG. 15, in both set of experiments, the protected link(s) experience considerably less delay jitter when SHAPE is used.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising: determining if a downlink data packet needs to be transmitted; transmitting said downlink data packet; determining if an uplink data packet has been received; determining if said received uplink data packet was transmitted by a protected station; performing scheduling by estimating a length of a protected portion of a scheduling cycle, said protected portion of said scheduling cycle being an interval reserved for use of said protected station; determining if said length of said protected portion of said scheduling cycle is greater than a length of said scheduling cycle ranking said links in said wireless network, and dismissing one of said links if said protected portion of said scheduling cycle is greater than a length of said scheduling cycle; and collecting data regarding said protected station and said link used by said protected station to transmit said received uplink data packet, measuring an inter-frame interval, and updating a running average of inter-frame interval duration, said collected data and said average inter-frame interval being used to estimate said length of said protected portion of said scheduling cycle.

2. The method according to claim 1, further comprising: performing physical carrier sensing; determining if a wireless communication is available for use; determining if said protected station needs to transmit said uplink data packet; and transmitting a clear to send message including an address of said protected station and a duration of an interval for use of said protected station.

3. An access point, comprising: a scheduling module which controls access opportunities of protected uplinks and protected downlinks, said scheduling module being in communication with an uplink profiler and a medium access module; said uplink profiler module maintains statistics regarding said protected uplinks, said uplink profiler being in communication with said scheduling module; said medium access module performs actual transmission of data, said medium access module being in communication with said scheduling module; said scheduling module estimates a length of a protected portion of a scheduling cycle, said protected portion of said scheduling cycle being said interval reserved for use of a protected station, determines if said length of said protected portion of said scheduling cycle is greater than a length of said scheduling cycle, ranks said links in said wireless network and dismisses one of said links if said protected portion of said scheduling cycle is greater than a length of said scheduling cycle; and said uplink profiler determines if an uplink data packet has been received, by determining if said received uplink data packet was transmitted by a protected station, collects data regarding said protected station and said link used by said protected station to transmit said received uplink data packet, measures an inter-frame interval and updates a running average of inter-frame interval duration, said collected data and said average inter-frame interval being used to estimate said length of said protected portion of said scheduling cycle.

4. The access point according to claim 3, wherein said medium access module performs physical carrier sensing, determines if a wireless communication is available for use, determines if a downlink data packet needs to be transmitted, transmits said downlink data packet, determines if said protected station needs to transmit said uplink data packet and transmits a clear to send message including an address of said protected station and a duration of an interval for use of said protected station.

* * * * *